United States Patent
Florea et al.

(10) Patent No.: US 7,610,179 B2
(45) Date of Patent: Oct. 27, 2009

(54) COUPLED PARAMETRIC DESIGN OF FLOW CONTROL AND DUCT SHAPE

(75) Inventors: Razvan Florea, Manchester, CT (US); Luca Bertuccioli, East Longmeadow, MA (US)

(73) Assignee: United Technologies Corporation, Hartford, CT (US)

( * ) Notice: Subject to any disclaimer, the term of this patent is extended or adjusted under 35 U.S.C. 154(b) by 479 days.

(21) Appl. No.: 10/948,114

(22) Filed: Sep. 24, 2004

(65) Prior Publication Data
US 2006/0069533 A1 Mar. 30, 2006

(51) Int. Cl.
G06F 17/50 (2006.01)
G06G 7/48 (2006.01)

(52) U.S. Cl. .............................................. 703/1; 703/7
(58) Field of Classification Search .................. 703/1, 703/7, 9
See application file for complete search history.

(56) References Cited

U.S. PATENT DOCUMENTS

| | | | | |
|---|---|---|---|---|
| 5,827,419 | A * | 10/1998 | Marsal et al. | 205/141 |
| 6,896,475 | B2 * | 5/2005 | Graziosi et al. | 415/1 |
| 6,996,986 | B2 * | 2/2006 | Arnold | 60/602 |
| 7,021,057 | B2 * | 4/2006 | Sumser et al. | 60/602 |
| 7,200,538 | B2 * | 4/2007 | Parsons et al. | 703/7 |

OTHER PUBLICATIONS

Nadeua et al: 2001., A Pareto model for OLAP view size estimation., IBM Press., pp. 1-13.*
Florea et al., Feb. 19, 2003, "Flow Parametric Design of Turbine Transition Ducts Using Flow Control", NASA Gelen Research Center. i-102.*

* cited by examiner

Primary Examiner—Paul L Rodriguez
Assistant Examiner—Eunhee Kim
(74) Attorney, Agent, or Firm—Carlson, Gaskey & Olds

(57) ABSTRACT

A method for designing gas turbine engine components using a coupled parametric analysis of part geometry and flow control is disclosed. Included are the steps of parametrically defining the geometry of the duct wall shape, parametrically defining one or more flow control actuators in the duct wall, measuring a plurality of performance parameters or metrics (e.g., flow characteristics) of the duct and comparing the results of the measurement with desired or target parameters, and selecting the optimal duct geometry and flow control for at least a portion of the duct, the selection process including evaluating the plurality of performance metrics in a pareto analysis. The use of this method in the design of inter-turbine transition ducts, serpentine ducts, inlets, diffusers, and similar components provides a design which reduces pressure losses and flow profile distortions.

14 Claims, 3 Drawing Sheets

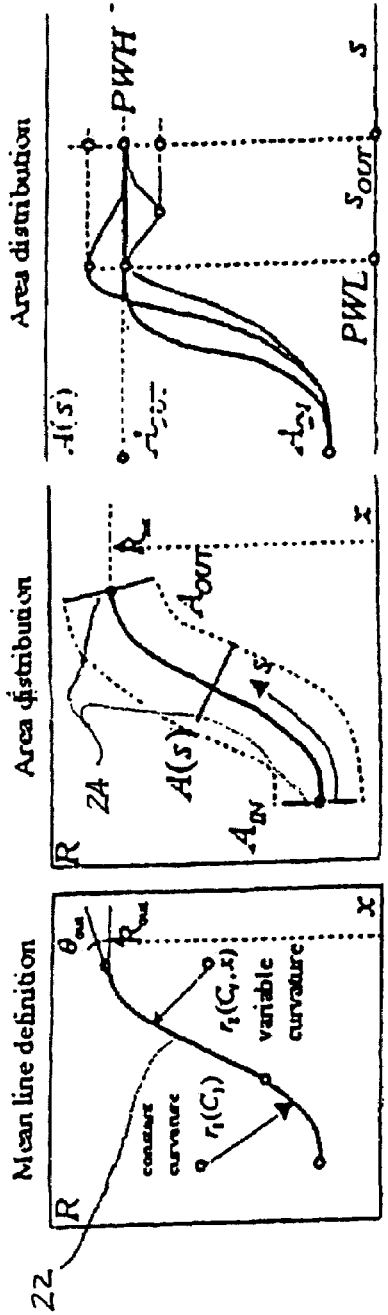
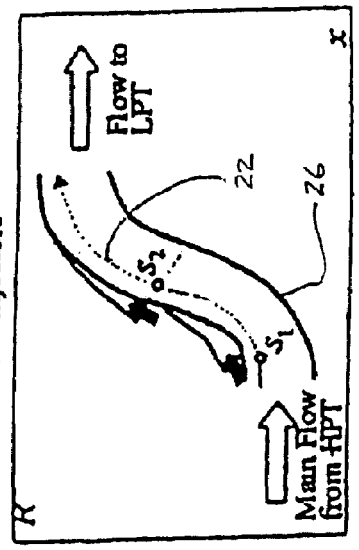

COUPLED PARAMETRIC DESIGN OF FLOW CONTROL AND DUCT SHAPE

GOVERNMENT INTEREST

The Government has rights in this invention, pursuant to NASA Contract No. NAS3-98005.

CROSS REFERENCE TO RELATED APPLICATIONS

Some of the subject matter disclosed herein is related to the subject matter of commonly owned U.S. patent applications and patents: Ser. No. 09/212,923, filed on Dec. 16, 1998, now abandoned, entitled "Method of Creating a Parametric Model in a CAD System"; U.S. Pat. No. 6,587,741, issued Jul. 1, 2003, entitled "Method and System for Designing a Spline Coupling"; U.S. Pat. No. 6,393,331, issued on May 21, 2002, entitled "Method of Designing a Turbine Blade Outer Air Seal"; Ser. No. 09/511,549, filed on Feb. 23, 2000, entitled "Method and System for Designing a Low Pressure Turbine Shaft", now U.S. Pat. No. 6,625,507, issued on Sep. 23, 2003; and Ser. No. 09/608,620, filed on Jun. 30, 2000, entitled "Method and System for Designing Frames and Cases", now U.S. Pat. No. 6,944,580, issued on Sep. 13, 2005. All of the foregoing patent applications and patents are hereby incorporated by reference.

I. FIELD OF THE INVENTION

The field of the present invention relates to parametric design approaches in the area of gas turbine engine components. More specifically, the present invention is directed towards the use of parametric methods which couples flow control and duct shape in the design of inter-turbine transition ducts, serpentine ducts, inlets and diffusers wherein the resulting design reduces pressure losses and flow profile distortions.

II. DESCRIPTION OF THE PRIOR ART

One of the major advancements in jet engines is the development of high temperature materials and cooling technology for turbine components. This technology has allowed the use of smaller cores (i.e., a compressor, combustion chamber and turbine assembly having reduced flow and diameter) with components that rotate at higher, more efficient speeds and operate at a higher-pressure ratio than previous designs. These smaller cores have emphasized the need to increase the radial offset between the low spool turbine components and the high spool components. Conventional diffuser (i.e., air intake) design methodology indicates that in order to achieve a high performance diffuser (e.g. a transition duct having large radial offset, or significant displacement in the radial direction between the inlet ring and aft frame portions of the transition duct), larger axial lengths are required to minimize losses and reduce flow profile distortions. These large axial lengths significantly reduce the weight and cost benefit of a large radial offset transition duct.

Like the transition duct, the inlet and nozzle components are essential parts of the engine function and may have to satisfy a large variety of constraints. For military aircraft, the propulsion system may be buried to reduce area cross section. The inlet and nozzle for such applications may be significantly long to minimize pressure losses. In addition, longer inlets may be required to reduce pressure distortions that could cause the engine to stall. The length of the inlet and/or nozzle may lead to undesired weight increase and, in the cases of some unmanned configurations, may become a limiting factor for the entire vehicle size.

Thus, there is a need for a methodology to design shorter, shaped inter-turbine transition ducts, serpentine-ducts, inlets, diffusers and similar duct components having enhanced performance (i.e. reduced pressure losses and flow profile distortions).

III. SUMMARY OF THE INVENTION

The present invention calls for a method of designing a duct component of a gas turbine engine, the steps comprising: 1) parametrically defining the geometry of the duct wall shape; 2) parametrically defining one or more flow control actuators in the duct wall; 3) measuring a plurality of performance parameters or metrics (e.g., flow characteristics) of the duct and comparing the results of the measurement with desired or target parameters; and 4) selecting the optimal duct geometry and flow control for at least a portion of the duct, the selection process including evaluating the plurality of performance metrics in a pareto analysis.

More specific aspects of the step of parametrically defining the geometry of the duct wall shape may include defining the mean line and an area distribution for the intended flow for the duct wall.

In addition, parametrically defining one or more flow control actuators in the duct wall may preferably include monitoring a number of the flow characteristics near the wall, such as shear stress, skin friction, frictional velocity and separation. In addition, the most preferred embodiment of that step includes identifying the location in the duct wall for at least one flow control or actuator, and subsequently redesigning the parametric duct geometry to include that actuator.

Furthermore, in at least one preferred embodiment, the performance metrics being measured and analyzed are from the group of parameters consisting of total pressure loss coefficients, pressure recovery coefficients, duct mass-flow, exit Mach number, and total flow control authority.

Also, in at least one preferred embodiment, measuring a plurality of performance metrics of the duct and comparing the results of the measurement with desired or target parameters includes comparing a flow profile in the duct with a target profile. This comparison may include decomposing the profile into spatial mode shapes.

The present invention provides a novel approach to the design of ducts for applications such as inter-turbine transition ducts, serpentine-ducts, inlets and diffusers, although persons of skill in the art will appreciate the applicability to other, similar gas turbine engine duct components. The design of the shape of the duct is coupled with parameterized flow control enabling the design of higher performance ducts with reduced length, larger offsets and/or improved flow quality (reduced flow distortion). The approach of the present invention is of general applicability to any duct or diffuser-like flow device, is best suited for subsonic flows, and can be used with both passive and active, steady and unsteady flow control schemes.

Some of the individual steps of the methodology of the present invention are not new in themselves. In fact, parametric geometries for aerodynamic design or flow control to improve flow characteristics have both been used extensively. However the coupling of the aerodynamic duct design with the design of the flow control is novel and can yield significant benefits.

IV. BRIEF DESCRIPTION OF THE DRAWINGS

FIGS. 1a-1d show an example of the parametric definition of the wall shape for an inter-turbine transition duct, including the steps of defining a meanline or centerline (FIG. 1a), defining the area distribution (FIGS. 1b and 1c) and altering the geometry of duct wall based upon the addition of flow control injectors or actuators (FIG. 1d).

V. DETAILED DESCRIPTION OF THE PREFERRED EMBODIMENTS

Figure 3:
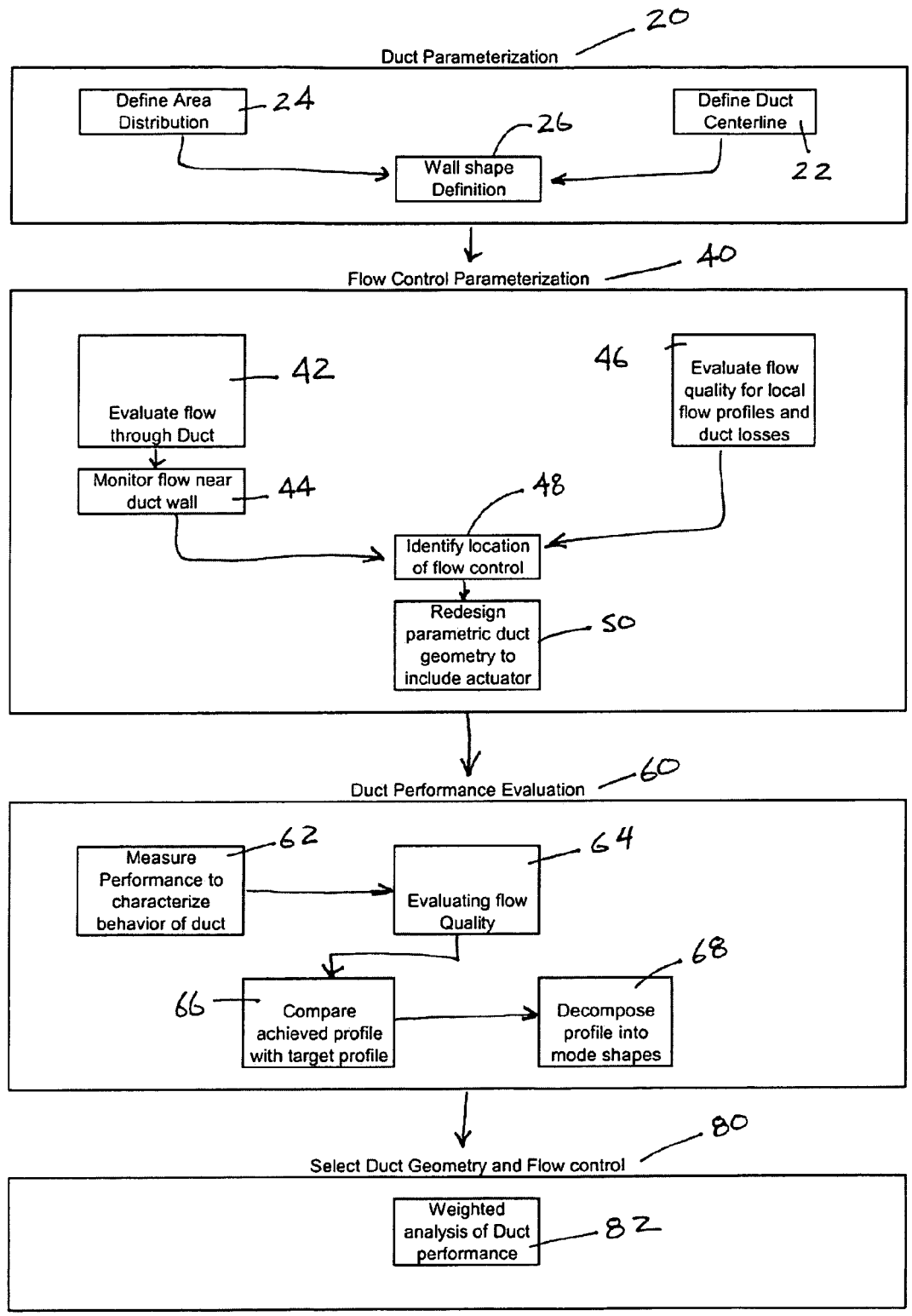
FIG. 3 is a flow diagram illustrating example method steps for designing a shaped fluid flow path.

Referring to FIG. 3, the overall process of the invention includes the step 20 of parametrically defining the geometry of the duct wall shape, the step 40 of parametrically defining one or more flow control actuators in the duct wall and associating the actuator position to the local flow characteristics, the step 60 of measuring a plurality of performance parameters or metrics (e.g., flow characteristics) of the duct and comparing the results of the measurement with desired or target parameters; and the step 80 of selecting the optimal duct geometry and flow control for at least a portion of the duct. Each of the steps of the claimed inventions, as reflected in various preferred embodiments of the present invention, is discussed in the examples set forth below.

A. Duct Geometry Parameterization

The duct geometry parameterization step 20 as reflected in a first preferred embodiment as applied to the design of an interturbine transition duct, is shown in FIGS. 1a-1d. In this preferred embodiment of duct geometry parameterization, the duct geometry is defined parametrically in terms of a meanline or centerline 22 and an area distribution 24. Since the primary objective of the design is to manipulate the flow, the area distribution in this example is defined as the area normal to the local meanline or centerline. This area is representative of the area normal to the local flow since in a well-behaved (un-separated) duct, the bulk flow will be approximately parallel to the meanline or centerline. Combined, the parametric meanline and area distributions result in a wall shape definition 26. In an alternative embodiment of the present invention (not shown), a local parameterization of wall shape can be added for applications where additional refinement of the duct geometry is required.

B. Flow Control Parameterization

Figure 2B:
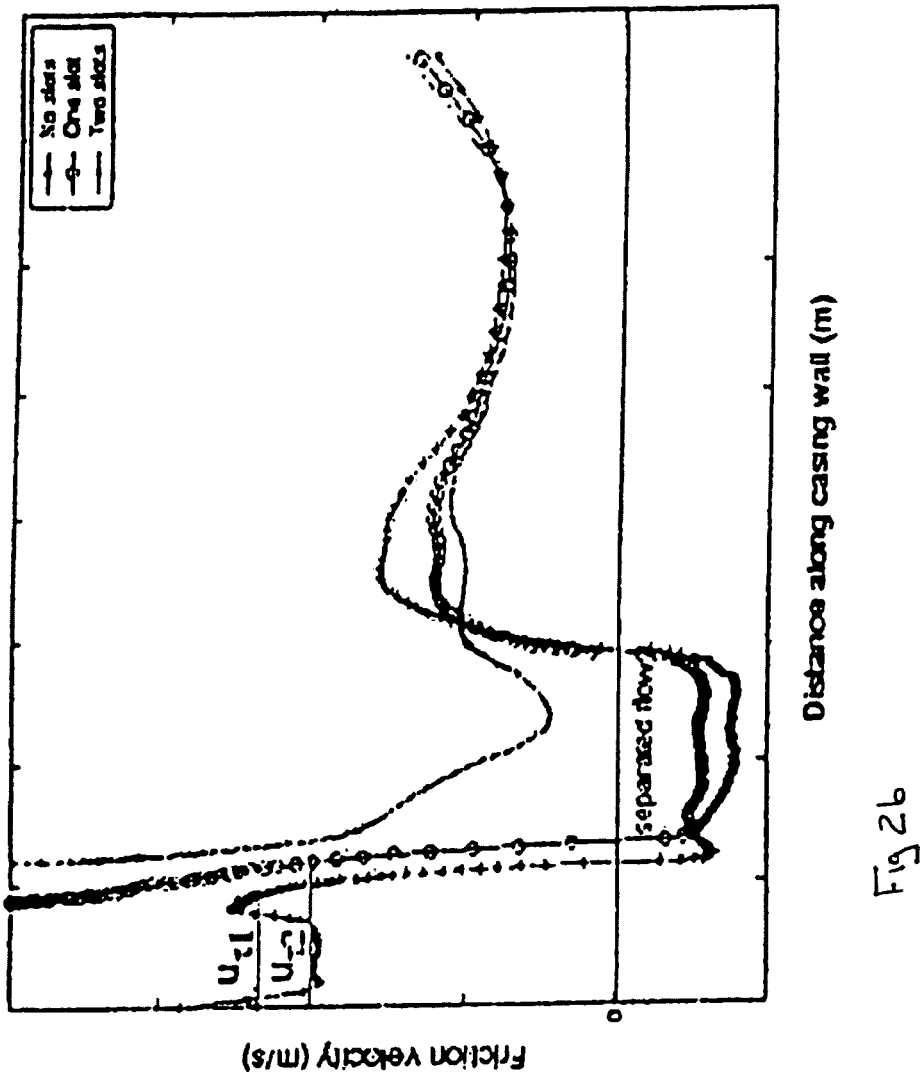
FIGS. 2a-2b show an example of the parametric flow definition step of the present invention including parametrically defining the flow control or injector positioning as shown on a transition duct wall (in FIG. 2a) based upon an analysis of effects of varying the number and position of flow control slots upon the local friction velocity on the duct wall (as shown in FIG. 2b).
Figure 2A:
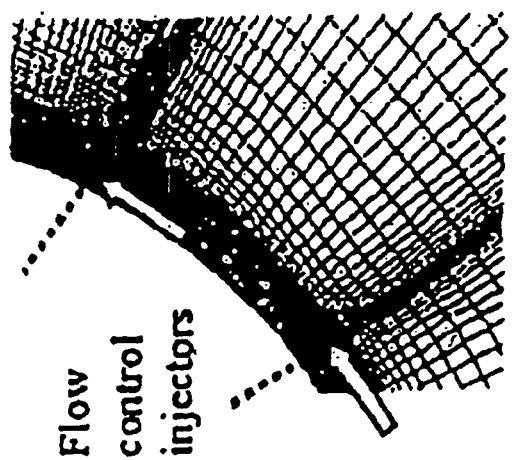

The step of flow control parameterization 40 preferably includes a number of substeps. That is, the flow control, such as steady or unsteady suction or blowing, is located in an iterative process. First, the flow through the duct without any flow control is evaluated using an appropriate computational or experimental approach 42. This process includes the substep 44 of monitoring the flow characteristics near the wall, such as shear stress, skin friction, frictional velocity and/or the presence of separation (cf. FIG. 2a). In addition, the process includes the substep 46 of evaluating flow quality metrics that characterize the local flow profile and duct losses for regions of interest (e.g., the duct exit section, or sections immediately after flow actuation). The flow characteristics and flow metrics may be evaluated using either numerical or experimental techniques that are known and understood by those of skill in the art. Specific examples of such techniques may be found, for instance, in Florea, R., Bertuccioli, L, Lin R., Tillman, G., Wagner, J., *Flow Parametric Design of Turbine Transition Ducts Using Flow Control,* Prepared for NASA Glen Research Center under Contract NAS3-98005, in response to Task No. 19, February 2003, which is incorporated in its entirety by reference.

The results of these substeps are then used in the substep 48 of identifying the location at which flow control should be added. For instance, a blowing slot can be added slightly upstream of the first occurrence of boundary layer separation to re-energize the boundary layer and prevent or diminish downstream separation. Once the new control location is identified, the next substep 50 is redesigning the parametric duct geometry to include the actuator (see FIG. 1d), and the performance of the modified duct is reevaluated using the same substeps set forth above. This process can be repeated as desired to add multiple instances of flow control. The distribution of friction velocity along the duct upper wall for selected transition duct geometry during the multi-step analysis of the flow control location is shown by way of example in FIG. 2b. The results in this example establish that the flow separation is delayed with the application of the first slot and eliminated with application of the second slot. In addition to the location of the flow control, the type of flow (suction, blowing, steady, unsteady, active, passive) can be parameterized as can the flow control authority at each flow control location.

C. Duct Performance Evaluation

The step 60 of measuring a plurality of performance parameters or metrics (e.g., flow characteristics) of the duct and comparing the results of the measurement with desired or target parameters is similar to the process used to determine the location of the flow control actuator(s) in that flow quality metrics and duct performance metrics are evaluated for the duct with the finalized set of flow control actuators. The specific metrics used will vary with the needs of the particular application. The duct performance metrics include, but are not limited to, total pressure loss coefficients, pressure recovery coefficients, duct mass-flow, exit Mach number, and total flow control authority. The particular selection of such metrics is dependent upon the particular component and application in question, as will be understood by those of skill in the art.

In addition to the substep 62 of measuring performance metrics that characterize the behavior of the duct in a global sense, the preferred embodiment of the present invention further includes the substep 64 of evaluating flow quality by examining profiles of relevant flow characteristics, such as total pressure and Mach number at sections of the duct that are of interest. For the applications that have been studied to date, these sections are in the diffusive portions of the duct and at the duct exit section. The locations where flow quality is evaluated and the particular flow characteristics that are examined depend on the specifics of the application. For instance, for an inter-turbine transition duct, it is desirable to have a constant total pressure profile and a linear Mach number profile at the exit of the duct. The "quality" of the flow at the exit of the parametric duct with flow control is assessed through the substep 66 of comparing the achieved profile with a target profile. This comparison is performed quantitatively by the substep 68 of decomposing the profile into spatial mode shapes. The amplitudes of the various modes present in the profile are used to determine how well the current duct design meets the application's flow quality objectives.

D. Selection of Optimal Duct Geometry and Flow Control

The step 80 of selecting the optimal duct geometry and flow control can include geometries which often lie beyond the range of traditional design experience. Thus, it is desirable to explore a large design space. In order to accomplish this without undue computational or experimental expense, a design of experiments approach is used. This approach allows a large, multi-dimensional design space to be explored using a minimal, yet sufficient, number of cases. For each case, the geometry and flow control scheme is generated parametrically and analyzed as described above. Typically a variety of performance metrics are of interest in a study, though the relative importance of each metric may not be clear.

In order to identify optimal cases without being dependent on selecting relative weightings for each performance metric, a pareto analysis approach is used. The pareto analysis includes the substep 82 of applying a range of weightings from zero to one to each performance metric such that the sum of the weightings applied to all the metrics being considered is always one. Then, using pareto analysis groupings known to those of skill in the art (which are dependent upon the type of component and the design objectives for that component) for each set of weightings, the optimal solution from the family of parametric cases is identified. This analysis yields not only individual optimal cases but also the sensitivities of the design to the various performance metrics.

If desired, or if the initial exploration of the design spaces was relatively coarse, the step of selecting an optimal duct geometry and flow control can, in an alternative embodiment, include the further substep 84 of exploring a smaller design space (i.e., a subset of the space analyzed above) that has been identified as an area of interest and can be initiated using a similar procedure to that set forth above. Such a hierarchical approach enables both the exploration of a large design space, thus identifying promising design approaches, as well as detailed geometry refinement to yield a specific optimized design.

Although the present invention has been shown and described with respect to the detailed embodiments thereof, it will be understood by those skilled in the art that various changes in the form and detail thereof, such as applying the present invention to the design of other than aeronautical equipment, and implementing the present invention with specific software or CAD systems, may be made without departing from the broader aspects of the present invention.

We claim:

1. A method of designing shaped fluid flow path such as a duct, diffuser or inlet, the component having one or more walls and including one or more flow actuators, the steps of the method comprising:
   a) parametrically defining geometry of the duct wall shape;
   b) parametrically defining one or more flow control actuators in the duct wall:
   c) measuring a plurality of performance metrics of the duct and comparing results of the measurement with desired or target parameters; and
   d) selecting an optimal duct geometry and flow control for at least a portion of the duct, the selection process including evaluating the plurality of performance metrics in a pareto analysis, and redefining the geometry of the duct wall shape in response to a defined flow control actuator within the duct wall;
   whereby the shaped fluid flow path selected provides enhanced performance characteristics.

2. The method of claim 1, wherein the step of parametrically defining the geometry of the duct wall shape includes defining a center line and an area distribution for an intended fluid flow for the duct wall.

3. The method of claim 1, wherein the step of parametrically defining one or more flow control actuators in the duct wall includes monitoring flow characteristics near the duct wall, said flow characteristics selected from a group consisting of shear stress, skin friction, frictional velocity and separation.

4. The method of claim 1, wherein the step of parametrically defining one or more flow control actuators in the duct wall includes identifying a location in the duct wall for at least one instance of flow control.

5. The method of claim 4, wherein the step of parametrically defining one or more flow control actuators in the duct wall includes redesigning a parametric duct geometry to include the one or more flow control actuators.

6. The method of claim 1, wherein the step of measuring a plurality of performance metrics of the duct includes measuring parameters from a group consisting of total pressure loss coefficients, pressure recovery coefficients, duct mass-flow, exit Mach number, and total flow control authority.

7. The method of claim 1, wherein the step of measuring a plurality of performance metrics of the duct and comparing the results of the measurement with desired or target parameters includes comparing a flow profile in the duct with a target profile.

8. The method of claim 7, wherein comparing a profile of the duct with a target profile includes decomposing the profile into spatial mode shapes.

9. A method of designing shaped fluid flow path such as a duct, diffuser or inlet, the component having one or more walls and including one or more flow actuators, the steps of the method comprising:
   a) parametrically defining a geometry of the duct wall shape;
   b) parametrically defining one or more flow control actuators in the duct wall; and
   c) modifying the geometry of the duct wall shape in response to changes in duct performance generated by the defined one or more flow control actuators; whereby the shaped fluid flow path design selected provides enhanced performance characteristics.

10. A method of designing a shaped duct including one or more fluid flow actuators, the method comprising the steps of:
   a) parametrically defining a geometry of a shaped duct;
   b) parametrically defining a location of a first fluid flow control actuator within the shaped duct;
   c) measuring performance parameters of the shaped duct and fluid flow control actuators as compared to a desired performance target; and
   d) redesigning the geometry of the shaped duct responsive to the defined location of the first fluid flow control actuator; and
   e) selecting a desired geometry of the shaped duct in response to the measured performance parameters meeting the desired performance target.

11. The method as recited in claim 10, including the step of defining a location of an additional fluid flow control actuator within the shaped duct after redesigning the geometry of the shaped duct responsive to the defined location of the first fluid flow control actuator.

12. The method as recited in claim 10, including the step of defining the first fluid flow control actuator as one of a suction device or a blowing device.

13. The method as recited in claim 12, including the step of redesigning the first fluid flow control actuator as one of a suction device or a blowing device responsive to the step of redesigning the geometry of the shaped duct.

14. The method as recited in claim 10, wherein the step of defining a location of the first fluid flow control actuator is evaluated in response to the redesign of the geometry of the shaped duct.

* * * * *

UNITED STATES PATENT AND TRADEMARK OFFICE
CERTIFICATE OF CORRECTION

| | |
|---|---|
| PATENT NO. | : 7,610,179 B2 |
| APPLICATION NO. | : 10/948114 |
| DATED | : October 27, 2009 |
| INVENTOR(S) | : Florea et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1019 days.

Signed and Sealed this

Twelfth Day of October, 2010

David J. Kappos
*Director of the United States Patent and Trademark Office*